(12) United States Patent
Hurwitz et al.

(10) Patent No.: US 9,344,150 B2
(45) Date of Patent: *May 17, 2016

(54) POWERLINE MODEM DEVICE

(71) Applicant: BROADCOM CORPORATION, Irvine, CA (US)

(72) Inventors: Jonathan Ephraim David Hurwitz, Edinburgh (GB); Dale Stubbs, Edinburgh (GB)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,704

(22) Filed: Apr. 21, 2015

(65) Prior Publication Data

US 2015/0229359 A1    Aug. 13, 2015

Related U.S. Application Data

(63) Continuation of application No. 13/242,859, filed on Sep. 23, 2011, now Pat. No. 9,031,120.

(30) Foreign Application Priority Data

Oct. 1, 2010    (GB) .................................. 1016549.6

(51) Int. Cl.
*H04B 1/38*    (2015.01)
*H04B 3/54*    (2006.01)
*G01D 4/00*    (2006.01)
(Continued)

(52) U.S. Cl.
CPC ................ *H04B 3/544* (2013.01); *G01D 4/002* (2013.01); *H04B 3/03* (2013.01); *H04B 3/46* (2013.01);
(Continued)

(58) Field of Classification Search
CPC .......... G01D 4/002; H04B 3/542; H04B 3/54; H04B 2203/5433; H04B 2203/5454; H04B 2203/5458; Y04S 20/40; Y04S 20/32; Y02B 90/245; Y02B 90/241
USPC ......................................................... 375/222
See application file for complete search history.

(56) References Cited

U.S. PATENT DOCUMENTS 8,265,776 B2 *    9/2012    Osann, Jr. ........................ 700/22
2008/0015740 A1 *   1/2008    Osann, Jr. ..................... 700/276

(Continued)

OTHER PUBLICATIONS

Information gatekeepers, "Broadband monthly newsletter" Feb. 2010 p. 12.*
HomePlug Powerline Alliance, "HomePlug Powerline Alliance Announces HomePlug "Green PHY" Specification for Smart Grid Applications" Jan. 6, 2010.*

*Primary Examiner* — Juan A Torres
(74) *Attorney, Agent, or Firm* — Garlick & Markison; Bruce E. Garlick (57) ABSTRACT

A broadband powerline communications device includes a plug for connection to mains electrical wiring, a broadband powerline medium interface circuit for communicating broadband data over the mains electrical wiring, at least one electrical socket for providing mains electrical power from the mains electrical wiring to a further device plugged thereto, and energy consumption monitoring circuitry for monitoring the energy consumption of the further device. These components are formed in a housing with the plug is integrally formed with the housing or separated from the housing by a length of power cable. The device may also include a communications socket for wired communications and/or a wireless router for servicing wireless communications. The device may further include a mains filter with one or more components of the mains filter used in determining the instantaneous level of the voltage and/or current supplied to the further device.

20 Claims, 7 Drawing Sheets

(51) Int. Cl.
*H04B 3/03* (2006.01)
*H04B 3/46* (2015.01)

(52) U.S. Cl.
CPC .............. *H04B 3/54* (2013.01); *H04B 3/542* (2013.01); *H04B 2203/5433* (2013.01); *H04B 2203/5454* (2013.01); *H04B 2203/5458* (2013.01); *Y02B 90/241* (2013.01); *Y02B 90/245* (2013.01); *Y04S 20/32* (2013.01); *Y04S 20/40* (2013.01)

(56) References Cited

U.S. PATENT DOCUMENTS

| | | | |
|---|---|---|---|
| 2008/0266025 A1* | 10/2008 | Blasco Claret et al. | 333/181 |
| 2009/0076748 A1* | 3/2009 | Robertson et al. | 702/62 |
| 2009/0096592 A1* | 4/2009 | Wu et al. | 340/310.12 |
| 2009/0251127 A1* | 10/2009 | Kim | 324/76.11 |
| 2010/0332164 A1* | 12/2010 | Aisa et al. | 702/62 |

* cited by examiner

POWERLINE MODEM DEVICE

CROSS-REFERENCE TO PRIORITY APPLICATION

The present U.S. Utility Patent Application claims priority pursuant to 35 U.S.C. §120 as a continuation of U.S. Utility application Ser. No. 13/242,859, entitled "POWERLINE MODEM DEVICE," filed Sep. 23, 2011, which claims priority pursuant to 35 U.S.C. §119(a) to Great Britain Application Serial No. 1016549.6, entitled "POWERLINE MODEM DEVICE," filed Dec. 1, 2010, both of which are hereby incorporated herein by reference in their entirety and made part of the present U.S. Utility Patent Application for all purposes.

BACKGROUND OF THE INVENTION

1. Field of the Invention

The present invention relates to communications devices and in particular to communications devices that communicate broadband around a network using mains power lines, and also to devices that monitor energy consumption.

2. Description of the Related Art

Powerline broadband modems are currently used for communicating broadband around a network using powerlines as the connecting medium. The connection points for this network (electrical sockets) are commonly found to contain a large collection of electrical equipment (for example, a media center in their living room).

A large benefit of using a pass-through design is that the modem does not remove one of the user's mains power supply sockets. There is also an increasing need to monitor energy usage, including domestic energy usage, in light of rapidly increasing energy costs, and concerns over the environmental impact of energy consumption. Smart meters have been developed, which operate typically by being inserted between the mains supply and the device(s) to be monitored. There are only a limited number of mains sockets available in a building, and therefore it would be advantageous to reduce the need for available sockets. It is therefore an aim of the present invention to address the above issues.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

In a first aspect of the invention there is provided a broadband powerline communications device including a substantially broadband powerline medium interface circuit that is configured to, in use, communicate broadband data over mains electrical wiring, the device including at least one electrical socket for providing mains electrical power from the mains electrical wiring to a further device plugged thereto; wherein the broadband powerline communications device includes means for monitoring the energy consumption of the further device.

In one embodiment the device may include an electrical socket accessory. The electrical socket accessory is ideally of standard size and dimensions and can directly replace a standard electrical wall socket accessory without any need to modify or replace the back box or wall aperture. In another embodiment the device includes a plug for connection to the mains electrical wiring via a standard electrical socket, the electrical connection for the device and the further device plugged thereto and the broadband data connection being made via the plug. The plug may be integral with the device housing, or may be separated by a length of power cable. The device may include a plurality of electrical sockets. The device may further include a communication socket for wired communication via the broadband powerline medium interface. Where the device has more than one electrical socket, it may further include a communication socket for each electrical socket. Alternatively, or in addition the device may also include a wireless router, for wireless communication via the broadband powerline medium interface. The device may include multiple standards of communication via the powerline medium interface and/or multiple standards of communication via wireless medium interface. The device may be operable to act as a bridge between any of these standards of communication. The device may be configurable so to have two or more separate IP and/or MAC addresses such that it can appear as two or more different nodes on two or more different networks. In a specific embodiment, the different networks may include a HomePlug AV network and a HomePlug GP network. The device may be operable to accumulate information from other HomePlug GP devices on the HomePlug GP network and then be further operable to transmit the information over the HomePlug AV network.

The device may include a single processor for control of the broadband interface function and the metering function.

The broadband interface function and the metering function may be performed by a single unit having a single DC power supply.

The device may include a mains filter for minimizing noise resultant from the further device, wherein one or more components of the mains filter is used in determining the instantaneous level of the voltage and/or current supplied to the further device. The one or more components may include a capacitor, for use as part of a capacitive divider circuit, for determining the instantaneous level of the voltage supplied to the further device. At least one of the capacitors may be formed from the parasitic capacitance between conducting layers of a printed circuit board (PCB), the dielectric of the capacitor including a non-conducting part of the printed circuit board. The one or more components may include an inductor, for use as a shunt resistance, for determining the instantaneous level of the current supplied to the further device.

The device may include a display operable to indicate the energy consumption in real-time. Where the device has more than one electrical socket, the display may indicate the combined energy consumption of all devices plugged into the device. Alternatively the device may have separate displays for each electrical socket, each display being operable to indicate energy consumption of the device plugged into its respective electrical socket.

The device may further include means for measuring the power consumption of the device itself, so that it can be discounted when determining the power consumption of the further device. The device may further include means to remotely turn off both the power and communications channels. The device may be operable to control the means via the power line medium. The means may include latching relays. The device may be operable to monitor Ethernet communication activity through it and may be operable to delay the turning off the power and communications channels to allow any communication to finish.

Where the device has more than one electrical socket, the device may include a single means to monitor energy consumption operable to perform measurements for all the electrical sockets and to record the consumption readings using multiplex techniques.

Figure 1:
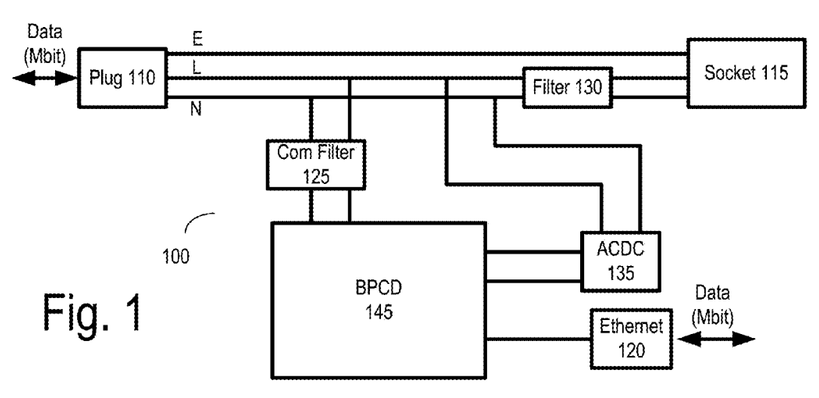
FIG. 1 shows a common configuration of a pass-through powerline broadband modem.
Figure 2:
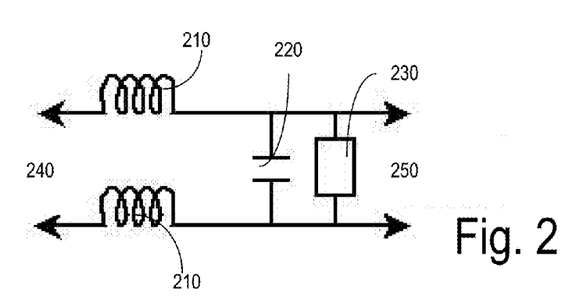
FIG. 2 shows a common mains filter arrangement as might be found in a pass-through powerline broadband modem of FIG. 1.

FIG. 1 shows a common configuration of a powerline broadband modem 100. External connections are a plug connection to the mains 110 and an Ethernet port 120 for attaching a PC/TV/set top recorder etc. There may also be provided (as in this example) a socket connection 115 for the user to plug in any electrical device. The internal components are made up of a communication filter 125, a mains filter 130, an AC DC power supply 135, and a Broadband powerline communication device 145. The role of the mains filter as shown in FIG. 2 is to filter out any electrical noise from the electrical device that is connected to the socket of the modem. The AC DC power supply 135 takes the AC mains voltage and creates a small DC voltage for supplying the Broadband powerline communication 145 and Ethernet connection devices 120.

In FIG. 1 the AC DC power supply 135 is connected on the plug 110 side of the mains filter 130, however, it can also be placed on the socket 115 side of the mains filter 130. Placing the AC DC power supply 135 on the socket 115 side of the mains filter 130 reduces the noise from the AC DC power supply 135 coming into the communication filter 125, while placing the AC DC power supply 135 on the plug 110 side of the mains filter 130 makes the physical implementation of the design easier to implement.

FIG. 2 shows a mains filter, suitable for use as the mains filter 130 of the pass-through powerline broadband modem 100. It includes inductors 210, a capacitive element 220, and an optional resistive element 230, arranged as shown between a differential input 240 to be connected plug-side, and differential output 250 to be connected socket-side, in the pass-through powerline broadband modem 100.

A smart meter is an advanced meter that records energy consumption and transmits the information via a communication network back to either a utility for billing, or to a user for the purpose of monitoring their consumption.

Figure 3:
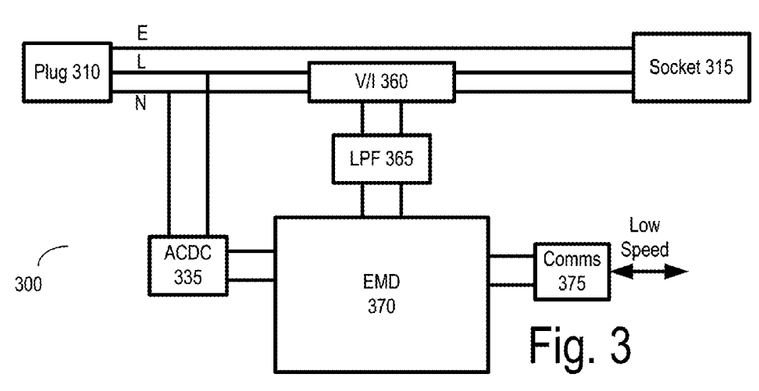
FIG. 3 shows a common configuration of an energy monitoring device.
Figure 4:
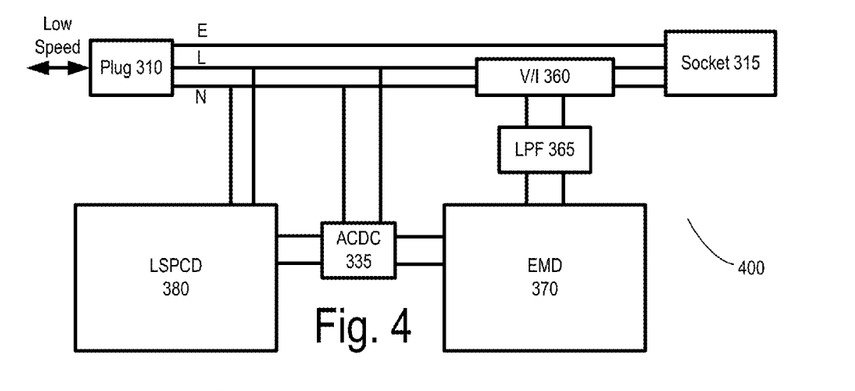
FIG. 4 shows an alternative configuration of an energy monitoring device.

FIGS. 3 and 4 show smart meters 300, 400 using different communication techniques (other custom wireless communications exist as well as LCD displays) for communicating output. External connections include a plug connection 310 to the mains and a socket connection 315 for the user to plug in any electrical device. FIG. 3 shows a smart meter 300 with output communication device 375 for its low speed output. Such an output communication device may include a wireless output device. As another alternative, FIG. 4 shows a smart meter 400 with a very basic low speed powerline communication device 380 for its low speed output. Common internal components of the smart meters 300, 400 include an AC DC power supply 335, voltage and current measurement circuitry 360, low pass filter 365, an energy measurement device 370 and the aforementioned communication devices 375, 380. The AC DC power supply 335 takes the AC mains voltage and creates a small DC voltage for supplying the energy measurement 370 and communication device 375, 380. The voltage and current measurement circuitry 360 produce differential voltages proportional to the voltage and current consumed by the device plugged into the socket 315. These voltages are then low pass filtered to remove the high frequency noise before entering the energy measurement device 370. The energy measurement device 370 can then compute power measurements and transmit them via a communication medium. The output communication devices 375, 380 in each case are operable purely for the transmission of the power measurements obtained by the metering device 300, 400 itself.

There are a number of known methods for a smart meter to measure both voltage and current, and therefore power consumption. In many cases, the methods used employ galvanic isolation for safety reasons. Galvanic isolation is the principle of isolating functional sections of electrical systems preventing the moving of charge-carrying particles from one section to another, i.e. there is no electric current flowing directly from one section to the next. Energy and/or information can still be exchanged between the sections by other means, e.g. capacitance, induction, electromagnetic waves, optical, acoustic, or mechanical means.

Galvanic isolation is used in situations where two or more electric circuits must communicate, but their grounds may be at different potentials. It is an effective method of breaking ground loops by preventing unwanted current from travelling between two units sharing a ground conductor. Galvanic isolation is also used for safety considerations, preventing accidental current from reaching the ground (the building floor) through a person's body. All modems that have an Ethernet port (or any other external connection to the modem) should be galvanically isolated to protect the user from risk of electrocution. Normal smart meters, such as those depicted in FIG. 3 or 4 do not have any external connections so therefore do not need to be galvanically isolated.

One well known galvanically isolated method of measuring voltage is a voltage transformer. The voltage on a secondary coil of the voltage transformer will be equal to the voltage on the primary coil divided by the ratio of the number of turns of the primary coil to the number of turns on the secondary coil.

Another galvanically isolated method of measuring voltage includes a capacitor divider circuit, which divides down the mains voltage. It includes, in its simplest form, three capacitors arranged such that all three are in series across the input, but only one of the capacitors (the largest, middle capacitor) is across the output. It is possible that the smaller capacitors (in the order of tens of Pico farads) could be formed from the parasitic capacitance between metal (or otherwise conducting) layers of a printed circuit board (PCB), the dielectric of the capacitor being defined by a non-conducting part of the printed circuit board. This concept is described in more detail in UK patent application GB 0918036.5.

The simplest non-galvanically isolated method of measuring voltage is a resistor divider, with the input across two resistors in series, and the output taken across only one of the resistors. High voltage resistors should be used. This method of measuring voltage is cheaper than using a voltage transformer, but can only be used in modems without an Ethernet or other external port. It is also the method usually used in conventional smart meters, which do not need to be galvanically isolated.

There are also a number of different ways for smart meters to measure mains current. As current smart meters do not need to be galvanically isolated, they tend to use a shunt resistor which produces a voltage proportional to the current flowing through it.

As with voltage measurement, a current transformer can be used as a galvanically isolated method of measuring current. As with voltage, the current on the secondary side is equal to the current on the primary divided by the turns ratio. This current can then be multiplied by a load resistance to form a differential voltage signal.

Another galvanically isolated method of measuring voltage is a Rogowski coil. A Rogowski coil is an air-core coil that is placed around the conductor carrying the current. It produces a voltage output that is proportional to the rate of change of the current in the conductor. The output voltage must be integrated to produce a voltage that is proportional to the amount of current flowing in the conductor.

Figure 5:
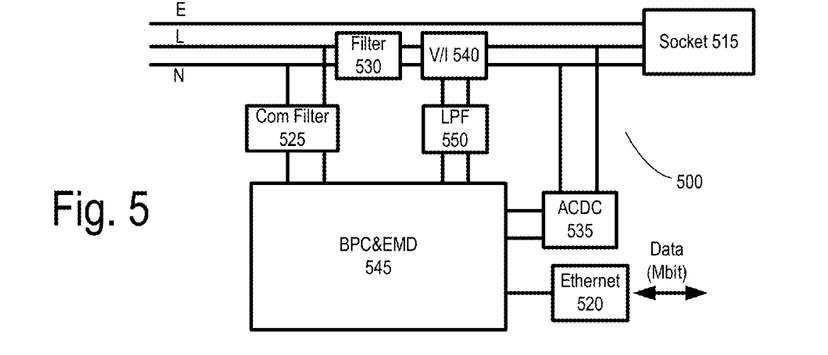
FIG. 5 shows a combined broadband modem and power metering device according to a first embodiment.
Figure 6:
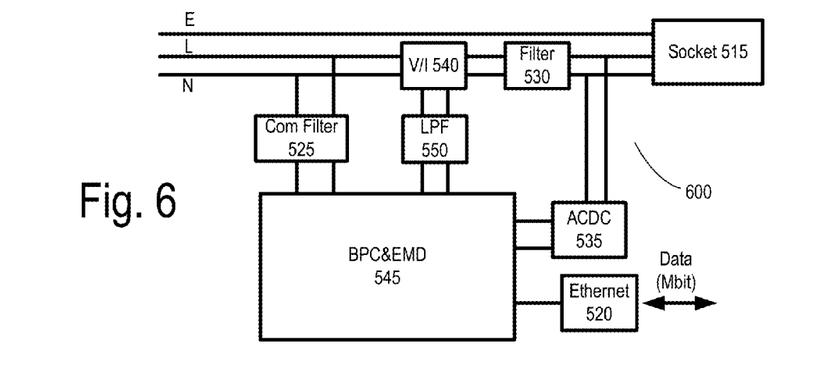
FIG. 6 shows a combined broadband modem and power metering device according to a second embodiment.

FIGS. 5 and 6 illustrate the components of which a combination device of some embodiments of the present invention may include. The device 500, 600 may be both a powerline broadband adaptor and a smart meter, and can take a number of forms, as will be described. Such a device is able to deliver high speed broadband throughout n network as well as measuring the power consumption of devices connected to the network. It includes a socket connection 515 for the user to plug in any electrical device, an Ethernet port 520, a communication filter 525, a mains filter 530, an AC DC power supply 535, current and voltage measurement circuitry 540, low pass filter 550 and a combined Broadband powerline communication device and energy measurement device 545. The only difference between the arrangements 500, 600 of FIGS. 5 and 6 is the position of mains filter 530. In FIG. 5 the AC DC power supply 535 is connected on the socket side of the mains filter 530, and in FIG. 6 it is placed on the supply side of the mains filter. Placing the AC DC power supply 535 on the socket side of the mains filter 530 reduces the noise from the AC DC power supply 535 coming into the communication filter 525, while placing the AC DC power supply 535 on the supply side of the mains filter 530 makes the physical implementation of the design easier to implement. This is because the mains filter is usually on a separate PCB and therefore having the AC DC power supply before the mains filter will only require one pair of connections between the main PCB and the mains filter PCB. Otherwise two pairs of connections would be needed to the main PCB, one before the filter and one after the filter.

The role of the mains filter 530 as shown is to filter out any electrical noise from the electrical device that is connected to the socket 515 of the modem. The AC DC power supply 535 takes the AC mains voltage and creates a small DC voltage for supplying the Broadband powerline communication and energy measurement device 545 and Ethernet connection device 520. The voltage and current measurement circuitry 540 produce differential voltages proportional to the voltage and current consumed by the device plugged into the socket. These voltages are then low pass filtered to remove the high frequency noise before entering the broadband powerline communication and energy measurement device 545. This will then compute power measurements and transmit them via Ethernet or/and powerline. The broadband powerline communication and energy measurement device 545 will at the same time be transmitting a broadband connection via powerline and Ethernet.

Figure 7:
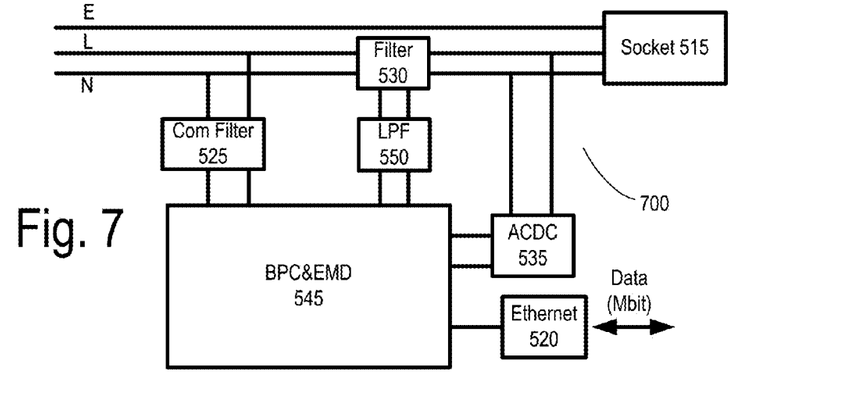
FIG. 7 shows a combined broadband modem and power metering device according to a third embodiment.

FIG. 7 shows a further variation 700 of the combination device of FIGS. 5 and 6. In this embodiment, there is no separate voltage and current measurement circuitry 540, this task being performed using the mains filter 530.

Figure 8:
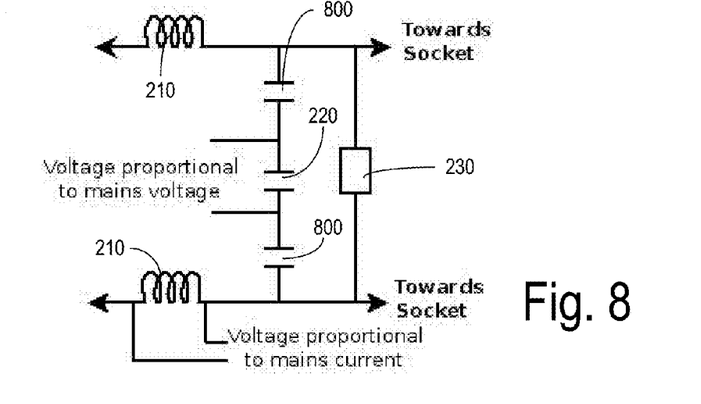
FIG. 8 shows mains filter arrangement adapted for voltage and/or current measurement.

FIG. 8 shows the mains filter circuitry to illustrate how the mains filter 530 can be used to produce the differential voltages proportional to the voltage and current consumed by the device plugged into the socket 515. The main difference compared to the mains filter of FIG. 2 is the addition of two further capacitors 800 in series with the first capacitor 220. This can then be used as a capacitor divider with galvanic isolated output proportional to the mains Voltage. Furthermore the parasitic resistance of one of the inductor coils 210 can be used in place of a shunt resistor to produce a (non-galvanically isolated) voltage proportional to the current flowing through it. By reusing the mains filter in this way it is possible to reduce the size and cost of the modem. Should galvanic isolation be a requirement, then the mains filter 530 of FIG. 8 can be used to measure the voltage, a separate measurement circuit being required only for the current measurement.

Figure 9:
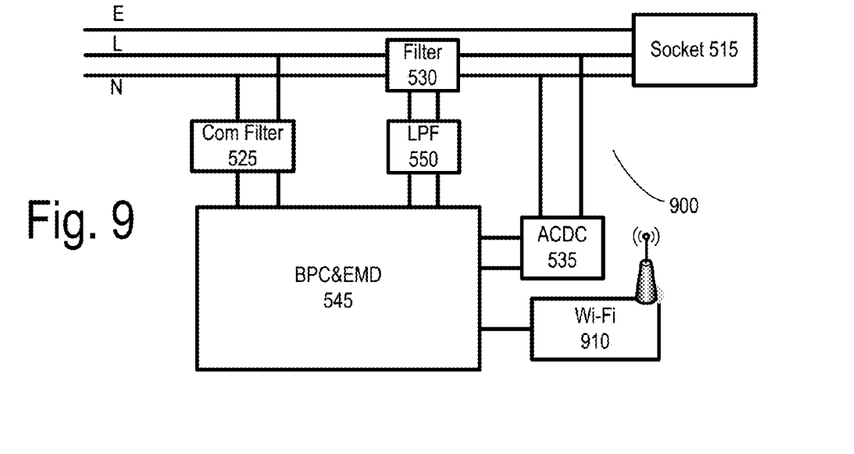
FIG. 9 shows a combined broadband modem and power metering device according to a fourth embodiment.

FIG. 9 shows a variation 900 where the modem is used as a Wi-Fi extender, so instead of using Ethernet the modem uses Wi-Fi sending module 910. The broadband information is passed through powerline and then via Wi-Fi to a remote device. The smart energy information can be sent via wireless or powerline. As this modem has no Ethernet port, non-galvanically isolated methods of voltage and current measurement can be used.

Figure 10:
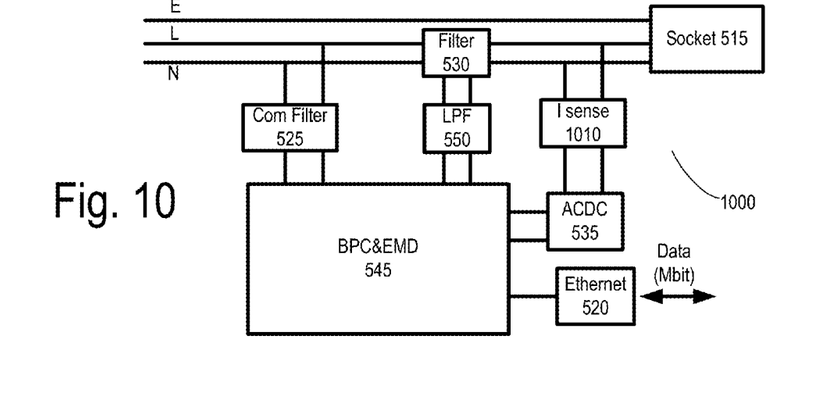
FIG. 10 shows a combined broadband modem and power metering device according to a fifth embodiment.

FIG. 10 shows a variation 1000 in which the power consumption of the modem itself is subtracted from the power consumption of the device plugged into the socket by adding a second current measurement 1010 to measure the power consumption of the modem. This value can then be subtracted from the overall current measurement to obtain a more accurate result.

Figure 11:
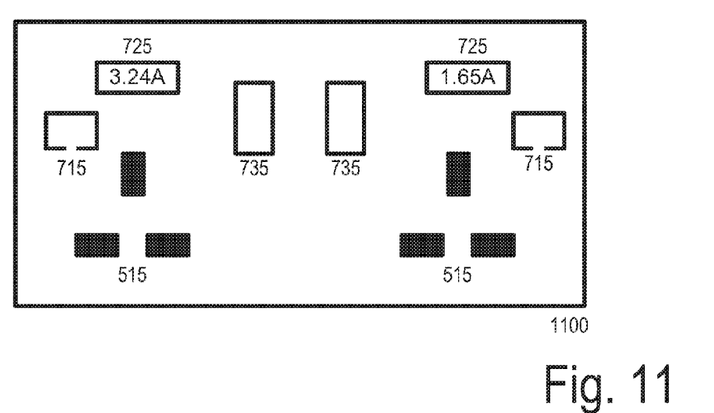
FIGS. 11 and 12 show an electrical accessory including sockets according to an embodiment of the invention.
Figure 12:
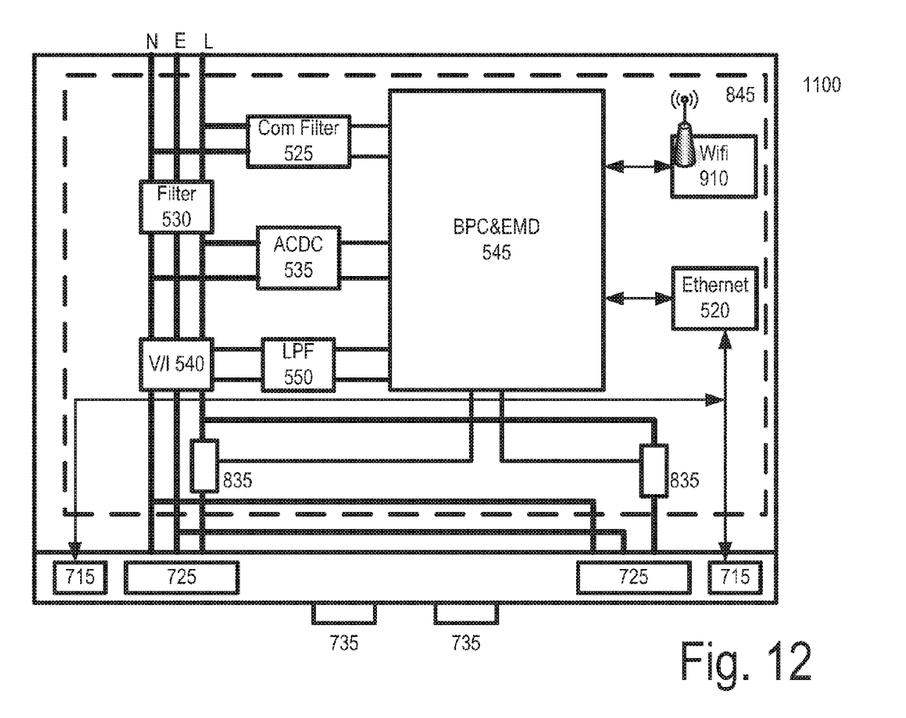

One physical embodiment of the combination devices described above 500, 600, 700, 900, 1000 is illustrated in FIGS. 11 and 12. This shows a conventional electrical socket accessory 1100 of the type usually mounted in a wall (or trunking) in any premises, whether it is domestic or workplace. The general arrangement shown is a two-gang accessory with pin arrangement as is standard in the United Kingdom, although it should be clear that this embodiment also covers one-gang or multiple-gang accessories, and accessories for other jurisdictions, whether two-pin or three-pin.

The majority of new televisions come with an Ethernet connection and are wall mounted by consumers. This does not leave room to fit a standard pass-through powerline modem behind the television as described above. If the user has a television stand which they use to hold their home media center containing games consoles, set top boxes and DVD players etc. they will also want to place this flush against the wall. Also, many of these devices also have an Ethernet port and need to be connected. Therefore, by placing the broadband powerline modem inside the socket you reduce the space taken up by the modem and allow the user to fit their television stand or television flush against a wall.

FIG. 11 shows the accessory 1100 including electrical sockets 515 and switches 735 as is conventional on such accessories. The accessory also has Ethernet ports 715 (which could number more or less that the two shown), and displays 725 which provide a real-time indication of the power consumption from each socket (for two- or more gang accessories, a single display showing the combined consumption from the sockets may replace the multiple displays 725). The information may be shown either in numerical form, graphic or via LED's, and may also be read remotely. It should be appreciated that the displays are optional and the consumption data may, alternatively or in combination with real-time display, be communicated over the powerline (using narrowband powerline standards or broadband powerline standards) or via wireless or Ethernet communication to another device.

FIG. 12 shows the components making up the accessory 1100. It is largely the same arrangement as shown in FIGS. 5 and/or 9, although it could be any of the variations described above, or any combination thereof. This particular example has both Ethernet 520 and Wi-Fi 910 communication capability, although it could just have either one (if only Wi-Fi then there would be no need for Ethernet sockets 715). This device could be used to increase Wi-Fi coverage around the home by having a transmitter in every socket, as well extending Ethernet coverage to every socket.

The accessory also includes relays 835. These enable the user to remotely turn off both the power and communications channels. This remote control may be activated via the powerlines from a device attached to the PLC network. Alternatively, or in combination a remote control may also be provided along with sensor means in the accessory. The ability to remotely turn on and off sockets by having a latching relay 835 is useful in enabling a smart home that can achieve maximum power saving. Additionally the unit may monitor the Ethernet communication used by a plug so as to detect activity, and if the device is remotely ordered to power-down, it may delay the power down action so as to allow communication to finish.

Figure 13:
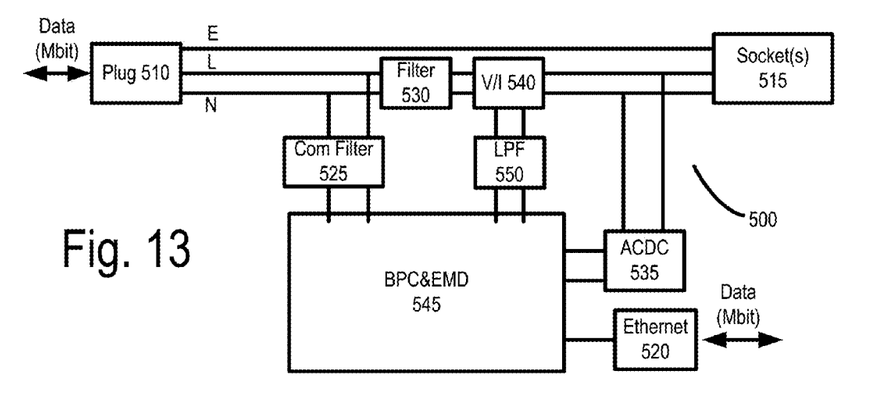
FIG. 13 shows an adaption of the device of FIG. 5 according to a further embodiment of the invention.
Figure 14:
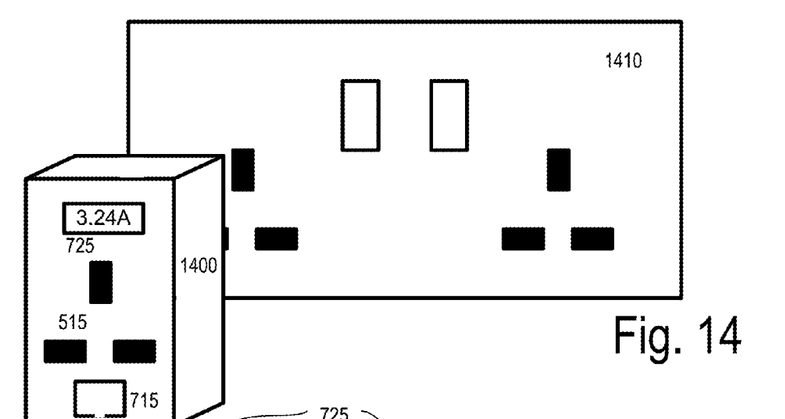
FIG. 14 shows a pass-through powerline broadband modem with smart metering device according to an embodiment of the invention.
Figure 15:
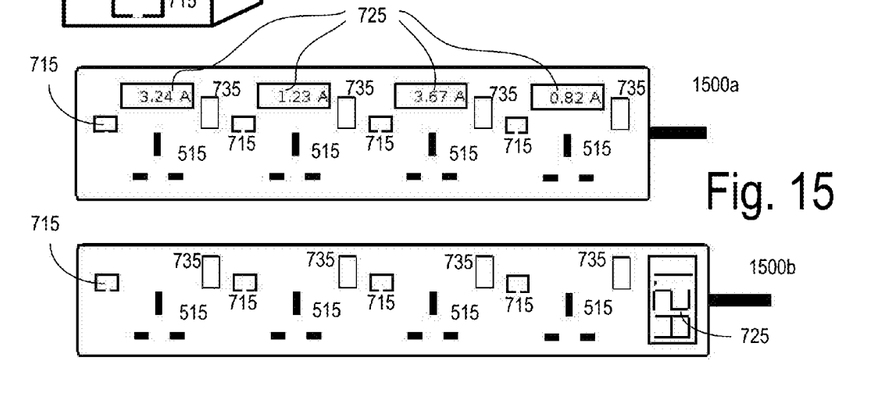
FIG. 15 shows electrical expansion/extension power strips according to an embodiment of the invention.

FIGS. 13, 14, and 15 show other physical embodiments of the arrangements disclosed herein. FIG. 13 shows the basic arrangement 500 of FIG. 5, but this time with the addition of a plug 510 for plugging into a conventional power socket in the normal manner. It should be appreciated that this adaption may be made to any of the arrangements shown above. Also relays 835 similar to those shown in FIG. 12, may be incorporated to either of these devices to provide remote control switching functionality for any of the devices plugged in through socket 515.

FIG. 14 shows a combined pass-through powerline modem with smart metering device 1400 in which a single casing includes a plug 510 (not shown on FIG. 14) for plugging into a conventional electric mains socket 1410, the socket 515 for a further electrical device and Ethernet socket 715 (and or Wi-Fi sender as before). Also shown is the optional consumption display 725.

FIG. 15 shows a similar arrangement in the form of electrical expansion/extension power strips 1500a and 1500b. Power strip 1500a has separate displays for each 10 electrical output socket 515, while power strip 1500b has a single display for the combined power output of all the electrical sockets 515. It has a plug 510 (not shown on FIG. 15), this time at the other end of a length of electrical cable so that the power strip can be moved away from the socket.

In all the above examples that have multiple electrical socket outputs, it is possible to provide only one metering unit, which can perform measurements for all the sockets and record and/or display the consumption readings using multiplex techniques.

Another possible feature is the provision to put the Ethernet into a power saving mode which will be entered into automatically if the device/accessory detects that nothing is consuming power at the plug. This can quickly be switched into normal mode if the plug detects a device using the plug or the Ethernet. The power saving mode can be further enhanced by sensing whether a communication is being passed over the Ethernet connection (such as a Firmware update) and, if this is the case, to not switch into the power saving mode. Most complicated devices get a regular update. This firmware is very important to the device and if power is removed during the update of firmware it could permanently damage the product.

Figure 16:
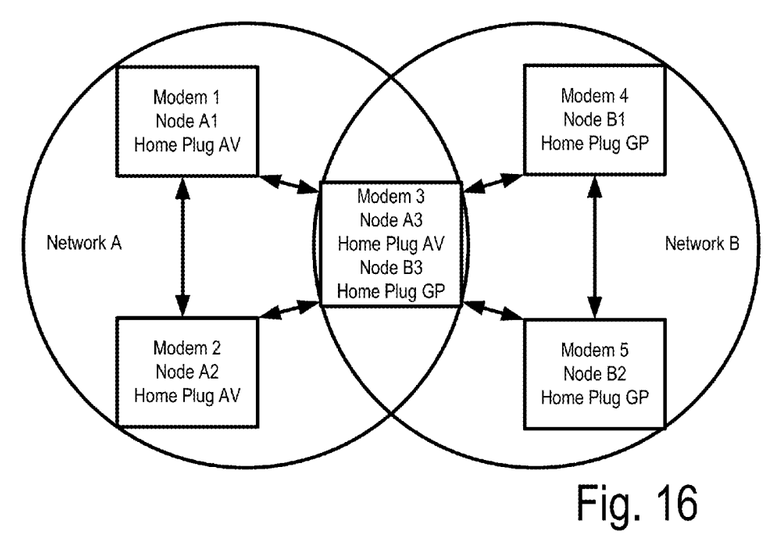
FIG. 16 shows a network arrangement implementing the pass-through powerline broadband modem with smart metering functionality as shown in any of FIGS. 5-7, 15 and 9-15.

FIG. 16 shows how the pass-through powerline modem with smart metering modem of any of the above embodiments (or else within the scope of the invention) can appear as two different nodes in two different networks. In the FIG., modem 3 (node A3 and node B3) is a device, as described herein, having a pass-through powerline broadband modem and a smart metering modem, which has two separate Medium Access Control (MAC) addresses so that it can appear as two different nodes on two different networks. The modem appears to modems 1 and 2 to be a Home Plug AV node on network A, and to modems 4 and 5 to be a Home Plug GP node on network B. Both networks A and B have different security keys and so cannot communicate with each other. This allows multiple configurations, for example the powerline broadband "Internet" network to be unencrypted and streaming information to a TV and the smart energy network to be an encrypted network run by the utility company sending back energy measurements.

In FIG. 16 the communication standards shown are Home Plug AV and Home Plug GP, but other communication standards could be used. These are Prime, G3, Meters and More, Home Plug C&C, Home Plug Green PHY, ZIGBEE, ZWAVE, M-Bus, and wireless M-Bus etc. for smart energy and GHN, P1901, Wi-Fi, HomePlug AV, HomePlug AV2 etc. for broadband communication. The system may include multiple powerline communication standards and/or multiple wireless communication standards. The system will be able to act as bridge between multiple powerline standards and/or wireless standards. For example narrowband powerline communication PRIME operates in the frequency range 42.0-88.9 kHz while broadband powerline Home Plug AV operates in the frequency range 1.8M-28M Hz, so both can coexist on a mains wire and the system could bridge information between the two communication standards. An example of how information could be bridged between a Home Plug Green PHY network and Home Plug AV network is explained in more detail below.

HomePlug Green PHY is a subset of HomePlug AV and is specifically designed for the requirements of the smart grid market. It has peak rates of 10 Mbit/s and is designed to go into smart meters and smaller appliances such as HVAC/ thermostats, home appliances and plug-in electric hybrid vehicles, so that data can be shared over a Home Area Network (HAN) and back to the utility. For these applications, there is no great need for high capacity broadband; the most important requirements are for lower power, robust, reliable coverage throughout the home, smaller size and less costly Bill of Materials. GreenPHY uses up to 75% less energy than HomePlug AV. Green PHY-based products will be fully interoperable with products based on HomePlug AV, IEEE 1901 or the upcoming HomePlug AV2 specification.

The advantages of reusing the entire 2-30 MHz band is that optimal performance can still be maintained (i.e. maximizing the number of potentially usable carriers), while tone masking, amplitude (TX power) maps for regulatory compliance and coexistence with amateur HAM radio bands are still supported. This is compared to narrowband PLC communications standards like PRIME etc. which only uses a small number of carriers and can suffer from noise of devices on the line.

Furthermore, since the MAC is also reused, not only can the Green PHY device receive HPAV beacons, it can also transmit HomePlug AV (HPAV) beacons. This means that a Single, standalone Green PHY device can be a member of an AV network and can be the Central Coordinator (CCO) in the AV network. However, in order to reduce MAC complexity, a Green PHY device is only required to be a CCO in support of Carrier Sense Multiple Access with Collision Avoidance (CSMA/CA) only. In HPAV terms, the Green PHY device only needs to be a Level-0 CCO. This means that connection oriented communication cannot be controlled by a Green PHY device, although it can participate in an AV network that permits connection oriented communications between HPAV devices.

As a result of the above, it is proposed to use a single receive channel to be both a HomePlug Green PHY and HomePlug AV PHY. This device could accumulate information from other HomePlug Green PHY devices on that network and then organize the data and transmit it over the HomePlug AV network. An example of this could be three nodes on a HomePlug Green PHY network, the first as part of a gas measurement configuration, the second as part of a water measurement configuration and the third as part of an electric measurement configuration. The third device is also a HomePlug AV device which takes the gas, water, and electric measurements and then transmits these over the HomePlug AV network to another HomePlug AV device connected to the user's home computer for display in real time. The third device appears as two different nodes in two different networks having two different IP addresses. It can switch between these in a time multiplexed fashion. Information can be exchanged between the two MAC addresses using header information.

The preceding embodiments are provided by way of example only and other variations and embodiments will be apparent to the skilled person without departing from the spirit and scope of the invention. In particular, many of the concepts of the embodiment above may be combined where feasible, for example, Wi-Fi functionality may be provided on the embodiment shown in FIG. 5, 6 or 10.

Figure 17:
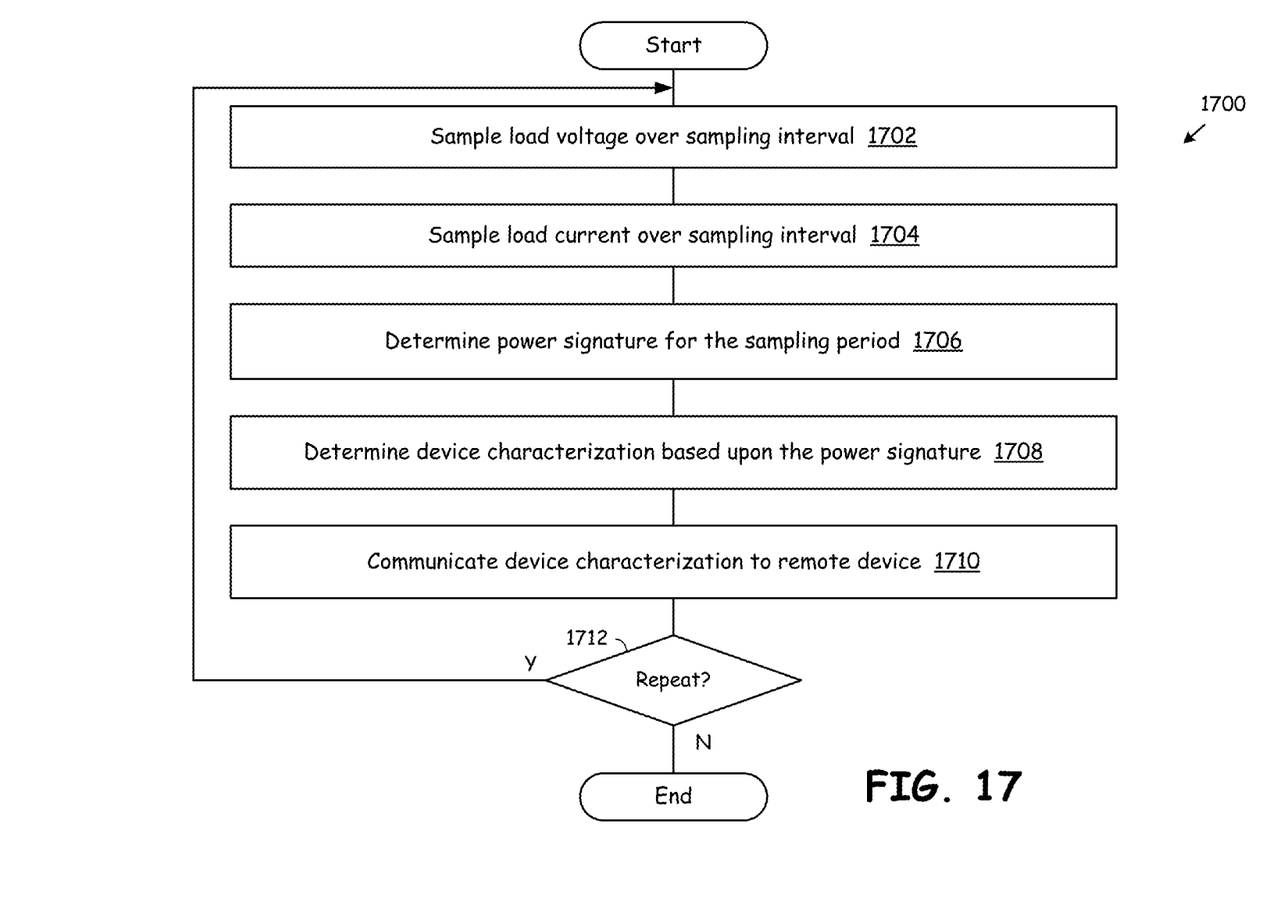
FIG. 17 is a flow chart illustrating operations according to one or more embodiments of the present invention for characterizing a coupled load based upon power signature.

FIG. 17 is a flow chart illustrating operations according to one or more embodiments of the present invention for characterizing a coupled load based upon power signature. According to the operations 1700 of FIG. 17, the energy consumption monitoring circuitry is further operable to determine a power signature of the further device and to determine a device characterization of the further device based upon the power signature. Such operations 1700 may further include communicating the device characterization to a remote device. The remote device may be a utility company load control computer center, which may subsequently shut down power to the further device consistent with load management operations.

In particular, the operations 1700 of FIG. 17 commence with sampling load voltage over a sampling interval (Step 1702). Sampling of the load voltage may be performed by the energy consumption monitoring circuitry described previously herein. The sampling interval may be over one or more power cycles, e.g., 50 Hz or 60 Hz. Operations further include sampling load current over the sampling interval (Step 1704). Operations continue with determining a power signature for the further device for the sampling period based upon the sampled load voltage and load current (Step 1706). Next, operation includes determining a device characterization based upon the power signature (Step 1708). The device may be characterized as a digital computer, a printer, a space heater, a water heater, a refrigerator, a washer, a dryer, a fan, a television, a stereo, a dishwasher, or another device that has a fairly unique power signature. Operation then includes communicating the device characterization to remote device such as a load management center, a home management system, or another device (Step 1710). These operations may be repeated, based upon a decision made at Step 1712. If so, operations return to Step 1702. If not, operations end.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention.

The invention claimed is:

1. A broadband powerline communications device comprising:
   a mains electrical wiring connection configured to receive mains electrical power;
   an electrical socket coupled to the mains electrical wiring connection and configured to provide the mains electrical power;
   a mains filter disposed between the mains electrical wiring connection and the electrical socket for minimizing noise resultant from a further device coupled to the electrical socket, the mains filter including at least one capacitor and at least one inductor;
   energy consumption monitoring circuitry configured to monitor energy consumption of the further device, wherein the energy consumption monitoring circuitry utilizes (1) the at least one capacitor in determining the instantaneous level of the voltage supplied to the further device, and (2) the at least one inductor in determining the instantaneous level of the current supplied to the further device;
   a Powerline Communication (PLC) interface configured to communicate broadband data via the mains electrical wiring connection;
   a broadband communications interface;
   a communications interface configured to bridge communications between the PLC interface and the broadband communications interface; and
   a processor configured to control the bridging of communications between the PLC interface and the broadband communications interface.

2. The broadband powerline communications device of claim 1, wherein control of the bridging of communications between the PLC interface and the broadband communications interface is based upon an operational status of the further device coupled to the electrical socket.

3. The broadband powerline communications device of claim 1, wherein the broadband communications interface comprises an Ethernet interface and/or a Wireless Local Area Network (WLAN) interface.

4. The broadband powerline communications device of claim 1, wherein the processor is further configured to selectively place the communications interface into a power saving mode based upon an operational status of the bridged communications.

5. The broadband powerline communications device of claim 1, further comprising a housing, wherein:
   the electrical socket is integrally formed with the housing; or
   the electrical socket is separated from the housing by a power cable.

6. The broadband powerline communications device of claim 1, wherein the at least one capacitor comprises a capacitor divider with a galvanic isolated output proportional to the voltage supplied by the mains electrical wiring connection.

7. The broadband powerline communications device of claim 1, further comprising a display configured to display energy consumption of the further device coupled to the electrical socket.

8. The broadband powerline communications device of claim 1, further comprising low pass filtering circuitry disposed between the mains filter and the energy consumption monitoring circuitry.

9. The broadband powerline communications device of claim 1, wherein the PLC interface is configured to support multiple PLC operating standards.

10. The broadband powerline communications device of claim 9, wherein the multiple PLC operating standards include HomePlug AV network standards and HomePlug GP network standards.

11. An integrated circuit configured to support a broadband powerline communications device that includes a mains electrical wiring connection configured to receive mains electrical power and an electrical socket coupled to the mains electrical wiring connection and configured to provide the mains electrical power, the broadband powerline communications device further including a mains filter having at least one capacitor and at least one inductor disposed between the mains electrical wiring connection and the electrical socket, the integrated circuit comprising:

an energy consumption monitoring circuit configured to monitor energy consumption of a device coupled to the electrical socket, the energy consumption monitoring circuit configured to utilize a voltage across the at least one capacitor in determining the instantaneous level of the voltage supplied to the device, and a voltage across the at least one inductor in determining the instantaneous level of the current supplied to the device;

a Powerline Communication (PLC) interface configured to communicate broadband data via the mains electrical wiring connection;

a broadband communications interface;

a communications interface configured to bridge communications between the PLC interface and the broadband communications interface; and a processor configured to control the bridging of communications between the PLC interface and the broadband communications interface.

12. The integrated circuit of claim 11 wherein the bridging of communications between the PLC interface and the broadband communications interface under control of the processor is based upon an operational status of the device coupled to the electrical socket.

13. The integrated circuit of claim 11, wherein the broadband communications interface comprises an Ethernet interface and/or a Wireless Local Area Network (WLAN) interface.

14. The integrated circuit of claim 11, wherein the processor is further configured to selectively place the communications interface into a power saving mode based upon an operational status of the bridged communications.

15. The integrated circuit of claim 11, further comprising self-power consumption monitoring circuitry configured to monitor energy consumption of the broadband powerline communications device.

16. The integrated circuit of claim 11, wherein the PLC interface is configured to support multiple PLC operating standards including HomePlug AV network standards and HomePlug GP network standards.

17. A broadband powerline communications device comprising:

a housing;

a mains electrical wiring connection extending from the housing and configured to receive mains electrical power;

an electrical socket coupled to the mains electrical wiring connection and configured to provide the mains electrical power;

a mains filter disposed between the mains electrical wiring connection and the electrical socket for minimizing noise resultant from a further device coupled to the electrical socket, the mains filter including at least one capacitor and at least one inductor;

energy consumption monitoring circuitry contained within the housing and configured to monitor energy consumption of the further device, wherein the energy consumption monitoring circuitry utilizes (1) the at least one capacitor in determining the instantaneous level of the voltage supplied to the further device, and (2) the at least one inductor in determining the instantaneous level of the current supplied to the further device;

a Powerline Communication (PLC) interface contained within the housing and configured to communicate broadband data via the mains electrical wiring connection;

a broadband communications interface contained within the housing and;

a communications interface contained within the housing and configured to bridge communications between the PLC interface and the broadband communications interface; and a processor contained within the housing and configured to control the bridging of communications between the PLC interface and the broadband communications interface, wherein the processor is further configured to selectively place the communications interface into a power saving mode based upon an operational status of the bridged communications.

18. The broadband powerline communications device of claim 17, wherein control of the bridging of communications between the PLC interface and the broadband communications interface is based upon an operational status of the further device coupled to the electrical socket.

19. The broadband powerline communications device of claim 17, wherein the broadband communications interface comprises an Ethernet interface and/or a Wireless Local Area Network (WLAN) interface.

20. The broadband powerline communications device of claim 17, wherein the at least one capacitor comprises a capacitor divider with a galvanic isolated output proportional to the voltage supplied by the mains electrical wiring connection.

* * * * *